3,154,376
EMULSION CONTROL IN LIQUID-SUSPENSION EXTRACTION
Bernice E. Paige, Kenneth L. Rohde, and Bill J. Newby, Idaho Falls, Idaho, assignors to the United States of America as represented by the United States Atomic Energy Commission
No Drawing. Filed Nov. 2, 1960, Ser. No. 66,893
3 Claims. (Cl. 23—14.5)

The invention relates to a novel method of solvent extraction, more particularly to an improvement on known methods of solvent extraction designed to recover unspent uranium and plutonium, fission product and other values in aqueous solutions encountered in the reprocessing of spent fuel elements from nuclear reactors.

Solvent extraction, also known as liquid-liquid extraction, is generally considered to be the most economical and is the most widely used method for recovering uranium, plutonium and other values in nuclear reactor fuel reprocessing. The recovery of such values is, of course, an economic necessity; no reactor now known is able to consume in a single run the fissionable fuel with which it is charged to anywhere near completion, and therefore the unconsumed portion must be recovered if the costs of reactor operation are not to become excessive. Furthermore, reactors produce transmutation products of great value as nuclear fuel, plutonium 239 and uranium 233, which must also be recovered, and some of the fission products have sufficient economic value for such purposes as leak testing, thickness gauging, and medical research that their recovery is likewise desirable.

Solvent extraction is a broad method adaptable to many different situations; in general, it consists essentially of bringing an aqueous solution containing both the sought and the unsought values into contact with a substantially water immiscible organic extractant liquid, whereupon one or more of the sought values will diffuse across the interface between the two immiscible liquids to a greater extent than will the unsought values until an equilibrium condition is reached, after which the liquids are physically separated by draining, decantation, syphoning, pumping or some other such means, and the sought values are then recovered from the organic liquid by distilling or evaporating it off, or by salting out the sought values from the liquid, or a combination of these.

Many different organic liquids, both pure organic compounds and solutions, are used as extractants, depending on the value or values sought to be extracted and the make-up of the aqueous solution which may contain only one unsought value or a large number of them; however complex the situation may be, two mathematical expressions have been found to hold good over wide ranges. The first of these is that every extractant has a constant value known as "K" with respect to any value in the aqueous solution from which extraction is to be made; when other variables are held constant and the diffusion of the value between the two immiscible liquids has reached an equilibrium, "K" may be mathematically expressed as follows:

$$K = \frac{\text{Concentration of a value diffused into the organic extractant liquid}}{\text{Concentration of the same value remaining in the aqueous solution}}$$

"K," which is known as the "distribution ratio," is a constant but only under standard conditions; it is sensitive to variations in such parameters as temperature, pressure, the pH of both the aqueous solution and the extractant liquid and the ionic strength of these; among the well known expedients to vary "K" to advantage is to raise or lower the pH of one or both the liquids, and perhaps the most common of all, to increase the ionic strength of the aqueous solution by the addition of a "salting-out agent" such as aluminum nitrate. All these details, however, are not considered a part of the present invention since they are well known to the art, and the invention can be utilized over a wide range of solvent extraction conditions.

The second pertinent mathematical expression is:

$$\beta = \frac{\text{``}K\text{'' with respect to the sought value or values}}{\text{``}K\text{'' with respect to the unsought value or values}}$$

$\beta$, which is known as the "separation factor," should desirably be as large as possible, to bring about which, in turn, the "K" of the numerator in the above expression should be made as large as possible and that of the denominator as small as possible by varying the parameters in the manner outlined. As a practical matter in the fuel reprocessing art, where all operations have to be carried out by remote control behind heavy shielding because of the dangerous radioactivity, it is desirable that $\beta$ be on the order of ten to the third power or more, and that the K of the denominator be no greater than unity, otherwise one contact will not be sufficient to bring about a substantially complete extraction. Of course, this desideratum cannot be attained in all cases, but it can at least be regarded as a practical goal. However, all these considerations may be regarded as preliminary to, rather than a part of our invention which provides a further simplification applicable to most, if not to all, solvent extraction procedures after the methods of parameter adjustments have done their utmost. Our invention, as will be seen, operates independently of the mathematical expressions above set forth, but of course, any extraction process employing our improved method will yield best results when, along with it, the parameters mentioned are adjusted as advantageously as possible.

Since the maximum separation factor $\beta$ is attained only after equilibrium of diffusion across the liquid interface has been reached, this can be greatly hastened by increasing the interfacial area by some form of agitation. Shaking of test tubes or separatory funnels is well known in the laboratory, and on an industrial scale various types of mixers are used, the commonest and probably the most efficient device now in use being a "pulsed column," where agitation is effected by rapid pumping back and forth through an array of baffles. It is during this agitation step, which is essential if the fuel reprocessing is to be carried out within a practical length of time, that the difficulty presents itself to which the present invention is addressed.

During the actual agitation of the two immiscible liquids it is desirable that they present a foamy, emulsified appearance since only then is their subdivision, and consequent increase of interfacial area, great enough to hasten the diffusion across the interface to the extent desired. Then, as soon as equilibrium has been reached and the agitation discontinued, the emulsion should be of a character that dissipates quickly in order to permit the two liquids to separate into discrete bodies, or "continuous phases," which may be separated. However, in many extraction operations the emulsion formed during the agitation fails to dissipate promptly at this point but persists in excess of ten minutes under standard test conditions, which is considered the maximum time that can be allowed for this purpose without imposing an unacceptable delay on the fuel reprocessing operation. In addition to the delay for the emulsion to dissipate, or for "phase coalescence" as it is commonly referred to, persistent emulsions of the kind mentioned usually leave behind deposits of colloidal solids, or "cruds" which tend to stop up pipe lines, initiate spot corrosion on the inside surfaces of vessels, and generally constitute a hazard due to their intense radioactivity.

Spectrographic analysis of the solids mentioned shows them to have a large silicon content, from which it has been suggested that their formation is due to the presence of suspended colloidal silica in the aqueous solution since silica, particularly when finely subdivided, is well known to have a tendency to form colloidal particles due to complex formation, physical entrapment, or a combination of these. This explanation appears to be substantiated by the fact that such colloidal formation is greater at lower acidities where the polymerization of silicic acid into colloidal silica is encouraged than at higher acidities where such polymerization is known to be inhibited; further confirmation can be found from the fact that colloid formation is greater when fuels are reprocessed the cladding metal of which contains silicon, such as aluminum, zirconium, or stainless steel alloys with a substantial silicon content. However, persuasive as these arguments may be in lending credence to this explanation for the persistance of certain emulsions giving rise to colloidal solids, we do not, of course, wish to be bound by it; finely divided elemental silicon has been found to be suspended in fuel reprocessing solutions as well as silica, and the possibility exists that it may contribute to the persistence of the emulsions and colloid formations, to say nothing of the fact that elements other than silicon may contribute to the persistence. Our invention, therefore, is not offered as rigorously based on any particular theory, but rather on the basis of empirical findings from actual experiments as will be explained in detail hereafter. However, as a matter of convenience in understanding the present invention and the prior art difficulties in overcoming the persistence of emulsions and the formation of the colloidal solids mentioned, the generally accepted theory attributing the main role to silica has been outlined briefly.

In order to overcome the difficulties mentioned, the prevailing practice has been to coagulate the suspended solids in the aqueous solutions resulting from the dissolution of the fuel elements with gelatin or some other protein coagulating agent, and to filter them out before proceeding further. This has not been altogether unsatisfactory as it has resulted in eliminating emulsion persistence and colloid formation to an acceptable degree, but it introduces into the process a filtration step which is time consuming and awkward to carry out by remote control. As a matter of fact, one of the chief reasons the older methods of precipitation and filtration were abandoned and superseded by solvent extraction as a means of fuel reprocessing was that it eliminated filtration operations; the prevailing practice of coagulating the suspended solids and filtering them therefore reintroduces a difficult operation which solvent extraction was designed to eliminate in the first place.

No acceptable alternatives to filtration have been found to be practical. Decantation, draining, pumping and the like all have the common drawbacks of being time consuming and not completely separating the liquid from the solids; a sizeable portion of the liquid necessarily remains with the solids, no matter how well settled, and the economically important uranium and other actinide values in this portion are lost.

Individual nuclear reactors yield batches of spent fuel requiring reprocessing only intermittently, so that it is not economical to build separate reprocessing plants for each of them; a plant, when built, has the inherent capacity to handle the output of several reactors, and it is therefore important to devise ways by which the same equipment may reprocess the fuel from different types of reactors with the minimum of modification from batch to batch. The addition of such steps as the coagulation of solids with protein and filtration above-mentioned requires a radical revision of a processing plant that is to be avoided if at all possible.

It is, therefore, the general object of the present invention to provide a method whereby values sought by solvent extraction may be secured without the need for a preliminary coagulation and filtration step.

It is a more particular object to provide a method whereby uranium, plutonium, and fission product values may be recovered from aqueous fuel reprocessing solutions with a substantial silicon content without the need for a preliminary filtration step.

All the foregoing objects are attained by our discovery that if to a fuel reprocessing solution a comparatively small concentration of protein material such as gelatin is added, and the solution is then boiled for a limited length of time, even when it contains such substantial amounts of solids as to be more accurately described as a suspension rather than as a solution, such suspension may be put directly into the solvent extraction contacting equipment and subjected to the high degree of agitation necessary to carry the process out, and not only will the extraction of the uranium or other sought values be equally efficient as if no suspended matter were present, but also the gelatinous protein material, rather than aggravating the colloidal situation as might be expected, greatly improves it so that the coalescence time of the two phases is markedly shortened and the formation of solid colloid material is largely, and in most cases entirely, inhibited. Theoretical explanations have been advanced to explain this action of protein material but since none of them have been conclusively proved it would serve no useful purpose to set them forth in detail; suffice it to say that the same materials such as gelatin, which have been found useful for coagulating solids such as suspended silica prior to filtration, also have the property of depriving them of their ability to form persistent emulsions and colloidal deposits in contacting equipment. Up until the present it has been generally accepted that materials of the class mentioned require conditions of stillness in order to be of any benefit, as shown by the designations applied to them of "flocculating agents," or "settling agents," but we have found them to be of use when subjected to violent and prolonged agitation in the way described. Inasmuch as our invention of using them in a new application appears to be generic in nature we have given our process the name of liquid-suspension extraction, as distinguished from conventional liquid-liquid extraction which contemplates bringing together two true liquids, both of which are substantially free of suspended matter.

It has been, of course, impossible to carry out an invention of such breadth in all its possible applications, but it will be found to be useful in any solvent extraction operation where emulsion persistence is troublesome. Among the situations where this is the case are, first, in the solvent extraction of uranium and other actinide element values out of what might be called "primary" solutions, the solutions directly resulting from the dissolving in aqueous nitric acid, aqueous hydrochloric acid or some other aqueous solvent, of spent nuclear fuel elements as soon as their initial radioactivity has subsided sufficiently to make this feasible, ordinarily a matter of ninety days or so after their withdrawal from a reactor. Such fuel elements are sometimes "decanned," that is to say, their cladding metal is removed from them by mechanical means, but probably more often this is not done, due to the difficulties of manipulation by remote control, and the elements, including their cladding, are dissolved together. In either case emulsions may persist when the aqueous solutions are subjected to solvent extraction to recover some of their values. Ordinarily, the first values sought are those of uranium and plutonium which are ordinarily in hexavalent form as $UO_2(NO_3)_2$, $UO_2Cl_2$, $PuO_2(NO_3)_2$, $PuO_2Cl_2$, and the like; the aqueous solution after the extraction, or "raffinate" as it is called, is then put through further extractions to recover fission product values such as cesium nitrate, cesium chloride, strontium nitrate, strontium chloride and the like, for which a demand exists. The anion of the salts mentioned depends, of course, on the acid used to produce the solution, and the individual salts are extracted from the solution either one by one by means of extractants with the requisite "K" values to do this, or in some cases, two or more are extracted together, and after they have been recovered from the extractant, they are again dissolved in an aqueous solvent and the resulting solution is contacted with a different extractant which, because of its "K" values, permits diffusion of one or more of the salts to a greater extent than the other, or others, and thereby separates them. As can be seen solvent extraction offers many possible methods of dealing with the solutions of nuclear fuel elements; the fission product values can be extracted prior to, rather than after, the actinide values, and the cladding metal values may be extracted at some stage though ordinarily this is not done by solvent extraction due to its expense; recovery of values of this kind, if done at all, is commonly carried out by some cheaper method such as precipitation, and of course, fuel reprocessing systems can be of a mixed type employing solvent extraction and other methods such as precipitation, ion exchange and the like at different stages. The solutions that may be encountered in fuel reprocessing, therefore, have many possible compositions, with many different combinations of values capable of extraction; the number of extractants which may be used is very great; a partial, but by no means complete, list of these is to be found in the patent to Glenn T. Seaborg, No. 2,882,124, issued April 14, 1959, which also has a partial list of the salting-out agents which can be used. For this reason many different procedures and modifications of present procedures are possible, but in any of these, regardless of the "route" chosen, where emulsion persistence becomes a problem, our invention is applicable.

We have made a large number of tests of the operation of our invention both on a laboratory and on an industrial scale. We have further found that there is a critical boiling, or digestion, time in carrying out the invention, before which the action of the protein material is rapidly enhanced by the boiling, and after which the rate of enhancement falls off rapidly.

In carrying out our invention the aqueous solution containing the sought and unsought values, and its suspended matter, which is known as the "feed solution" or "feed" in the reprocessing art, is given a "pre-treatment" prior to its introduction into the solvent extraction or "contacting" equipment. The suspended solids are, as above explained, mainly silicon in either its elemental state or in one of its various states of oxidation; when the cladding metal is dissolved in an aqueous acid such as nitric acid a minor portion of the silicon goes into true solution like aluminum, zirconium, iron, and the numerous other metals which are used; a major portion, however, of the silicon does not truly dissolve but goes into a fine suspension in the elemental state. As time goes on and if the acid is of an oxidizing character such as the nitric acid, depending on its strength and whether the ambient atmosphere is oxidizing or not, the silicon becomes oxidized by stages in a manner that, while not understood in perfect detail, results mainly in silicic acid at higher acidities or its polymer, silica, at lower acidities, the respective amounts of all these oxidized and unoxidized components varying under different conditions. For practical purposes of solvent extraction it is not necessary that these chemical species be rigorously characterized; spectrographic determination of the presence of silicon in whatever state it happens to be provides a sufficient identification to enable the operation to be controlled, and this, of course, is true for other values.

The pretreatment of our invention consists of leading the aqueous feed solution into a vessel and adding the protein agent thereto in a comparatively small concentration, the latter being dependent on the parameters of acidity, ionic strength and the like, of the feed solution. With as broad and generic an invention as ours it has not been practicable to determine the exact operating ranges of the concentration of the agent for any and every possible feed solution, but we have found concentrations of from about 50 to about 200 milligrams of protein agent per liter of solution to be practical for most feed solutions now in actual use, the acidity of the latter varying from about 0.3 N to about 1.4 N.

Of the various protein agents for carrying out our invention, gelatin, a protein consisting essentially of a copolymer of the amino acids glycine, proline, and hydroxyproline, is preferred.

It is believed that the mere addition of the protein agent to the feed solution alone may bring about some measure of improvement in hastening the dissipation of an emulsion after agitation has been discontinued, but this hastening, or reduction of "coalescence time" of the two phases, is not sufficient for a practical reprocessing operation; anything over 600 seconds at standard test conditions is considered excessive for this purpose, and to this end some kind of "digestion," or heating to near, and preferably at, the boiling point of the solution, is necessary.

In making tests to determine the time needed to bring about the digestion referred to we have found the amount of solids or "cruds" brought into existence to be proportional, at least approximately, to the coalescence time of the phases, and therefore the latter can be taken as being inversely proportional to the overall improvement brought about by the operation of our invention. We have found, rather surprisingly, that this inverse proportionality is not linear with respect to digestion time, but decidedly non-linear in a manner somewhat resembling a logarithmic curve of diminishing returns, if not rigorously so. Due to the broad character of this invention it has not been possible to establish this relationship with mathematical certainty for all the many complicated feed solutions, but a casual inspection of our results in the tables below will show a falling off of the rate of decrease of coalescense time after a certain digestion time has been passed. Of course, the decrease of coalescence time is also dependent on parameters such as acidity, ionic strength, and silicon content, as already pointed out, but the effect of these is merely parametric, and the principle of our invention holds good regardless of how these are adjusted.

EXAMPLE I

An aqueous feed solution resulting from the dissolution of fuel elements which were 5 percent by weight in AlSi was 1.56 M in aluminum and 0.001 M in zirconium and contained about 0.24 gram per liter of silicon as determined by spectrograph; this was divided into aliquots and acidified as indicated in the left-hand column of Table I below. The organic extractant was 3.25 percent tributyl phosphate in Amsco, a predominantly aliphatic hydrocarbon mixture similar to kerosene. Gelatin was added in a one percent by weight (1 w/o) aqueous solution to the aliquots of the feed solution prior to their contact with the extractant; their gelatin concentration after this addition, in milligrams per liter, are indicated in the second column from the left as "Gelatin Dosage." The aliquots were digested at 20° C. for the times given in the third column from the left, the aliquots were then agitated with the extractant, the agitation discontinued, and the phase coalescence times for each aliquot recorded as set forth in the right-hand column. The greater than equality sign before the coalescence times of 600 seconds means that for practical reasons timing was discontinued after the time indicated; as a matter of fact the actual coalescence times were far more, in some cases several days.

Table I
EFFECT OF 20° C. DIGESTION ON SURFACE ACTIVITY OF 5 PERCENT AlSi FUELS

| Solution Acidity, N | Gelatin Dosage, mg./l. | Time of Digestion, 20° C., Minutes | Coalescence Times, Seconds |
|---|---|---|---|
| 0.3 | 0 | 3 | >600 |
| 0.3 | 100 | 30 | >600 |
| 1.38 | 0 | 3 | >600 |
| 1.38 | 100 | 30 | >600 |

The above table suggests the need of digestion at an elevated temperature.

EXAMPLE II

The same feed solution as in Example I was divided into aliquots and given the gelatin dosages and acid normalities, indicated in Table II; the notation $N^A$ indicates acid normality. The aliquots were digested at the boiling point as indicated and extracted with the same extractant after the same time of agitation in the same equipment. Phase coalescence time resulted as follows:

Table II
EFFECT OF ACIDITY, GELATION DOSAGE, AND DIGESTION TIME ON SURFACE ACTIVITY OF 5 PERCENT AlSi FUELS

| Gelatin Dosage, mg./l. | Coalescence Times, Seconds, with 3 Minute Digestion at Boiling Point | | Coalescence Times, Seconds, with 30 Minute Digestion at Boiling Point | |
|---|---|---|---|---|
| | 0.3 $N^A$ | 1.4 $N^A$ | 0.3 $N^A$ | 1.4 $N^A$ |
| 0 | >600 | >600 | >600 | 140 |
| 50 | 304 | 171 | 169 | 126 |
| 100 | 385 | 174 | 166 | 131 |
| 200 | >600 | 160 | 148 | 136 |

The above Table II indicates a marked decrease in coalescence time when digestion of the gelatin is carried out at the boiling point, although the parametric influence of higher acidity is at the same time evident.

EXAMPLE III

In order to investigate the effects of variation in digestion time on coalescence time the same feed solution with the same extractant and the same agitation time as in the first two examples was acidified to 0.3 $N^A$ and given a gelatin concentration, or dosage, of 200 mg./l. Table III shows the phase coalescence times resulting from various times of digestion.

Table III
EFFECT OF DIGESTION TIME ON SURFACE ACTIVITY OF 5 PERCENT AlSi FUELS

[0.3 N acid solution with 200 mg./l. gelatin digested at boiling point]

| Time of digestion, minutes: | Coalescence time, seconds |
|---|---|
| 3 | >600 |
| 5 | >600 |
| 10 | 186 |
| 30 | 148 |

The above Table III brings out strikingly the non-linear relationship between digestion time and improvement in phase coalescence time above-mentioned. Due to practical considerations as above explained, the improvement resulting from the first two experiments required too much time to measure, and so the coalescence is indicated merely as greater than 600 seconds. The improvement between the aliquot digested for ten minutes and the one digested for five minutes was therefore no less than 600 seconds minus 186 seconds, or 414 seconds, the effect of the inequality sign being ignored for the time being in order to be on the safe side. The improvement between the aliquot digested for 10 minutes and the aliquot digested for 30 minutes was 186 seconds minus 148 seconds, or only 38 seconds. Again, assuming on the safe side that all this 38 seconds of improvement took place in the 10 minutes immediately after the 10 minute mark, the ratio of the rates of improvement before and after this mark can be stated to be no less than:

$$\frac{414}{38} = 10.9$$

Thus the rate of improvement before the 10 minute mark is well over 10 times as great as the rate before that mark even when the inequality sign is ignored, so that for this particular feed solution, at the gelatin concentration, acidity, and other parameters indicated, the 10 minute mark is, or is close to, a critical point.

EXAMPLE IV

The same feed solution as in the preceding examples was divided into aliquots and acidified and dosed with gelatin as indicated in Table IV. All aliquots were digested for the uniform time of 3 minutes, agitated the same length of time with the same extractant as in the other experiments, with resulting phase coalescence times as follows:

Table IV
EFFECT OF GELATIN TREATMENT OF 5 PERCENT AlSi FUEL OVER THE NORMAL RANGE OF PROCESS ACIDITY

[Digested for 3 minutes at the boiling point]

| Gelatin Dosage, mg./l. | Coalescence Time, seconds | |
|---|---|---|
| | 0.8 $N^A$ | 1.8 $N^A$ |
| 0 | >600 | >600 |
| 50 | 265 | 198 |
| 100 | 270 | 171 |
| 200 | 244 | 158 |

The above table indicates that at the constant digestion time of 3 minutes gelatin dosages within the range of 50 to 200 mg./l. give satisfactory coalescence times with the same extractant. The minor differences within this range are regarded as not significant to any great degree and are probably within the limits of experimental error.

EXAMPLE V

In order to test the over-all efficiency of our invention certain of the aqueous raffinates, as indicated below, from the previous examples were collected after the phases had coalesced and analyzed to determine if any significant loss of uranium values had taken place due to our added steps of adding gelatin and boiling. Table V tabulates these results in milligrams per liter of loss of uranium.

Table V
EFFECT OF ACIDITY, GELATIN DOSAGE, AND DIGESTION TIME ON URANIUM LOSSES TO RAFFINATE

[Raffinate uranium loss, mg./ml.]

| Gelatin Dosage, mg./l. | 3 Minute Digestion at Boil | | 30 Minute Digestion at Boil | |
|---|---|---|---|---|
| | 0.3 $N^A$ | 1.4 $N^A$ | 0.3 $N^A$ | 1.4 $N^A$ |
| 0 | 0.030 | 0.127 | 0.028 | 0.106 |
| 50 | 0.022 | 0.120 | 0.028 | 0.106 |
| 100 | 0.024 | 0.101 | 0.025 | 0.127 |
| 200 | 0.027 | 0.104 | 0.031 | 0.108 |

It will be noted that in the top line of results in Table V where the concentration of gelatin in the first extraction was zero, the loss of uranium is never significantly less, and in most cases is actually greater, than the loss where our process employing gelatin was used. Thus our invention, in addition to expediting solvent extraction and avoiding deposits of solids, is shown to cause at the most but a minor loss of uranium compared to the prior art, and in most cases actually to improve the recovery of uranium over the prior art.

EXAMPLE VI

In a plant for processing the end pieces of neutron irradiated uranium fuel elements having a 37 percent AlSi content considerable trouble with emulsions had been experienced in the pulsed columns. The aqueous solution contained 1.55 M Al and 0.65 g./l. U, with about 1.3 g./l. of silicon as determined spectrographically. This was agitated in pulsed columns with the organic solvent, a solution of 3.25% tributyl phosphate in Amsco solution. A pretreatment system for the aqueous solution was added whereby 100 mg./l. of gelatin was added, and it was heated to boiling for about 6 minutes prior to its entering the pulsed columns where it was agitated by pumping back and forth at the rate of 35 to 75 reversals, or "cycles" per minute. No filtration step was included in the pretreatment. Emulsion formation in the columns was largely suppressed and after identical conditions of agitation in the columns for the same length of time, the phase coalescence time was reduced from more than 600 seconds to 90 seconds at 0.97 N acidity, and from more than 600 seconds to 50 seconds at 0.87 N acidity. Recovery of uranium values from the Amsco solution was satisfactory, the uranium loss being only $2 \times 10^{-3}$ grams per liter of feed solution.

It will be understood that this invention is not to be limited to the details given herein but that it may be modified within the scope of the appended claims.

What is claimed is:

1. A method or recovering sought values from an aqueous solution containing dissolved sought values comprising uranium, dissolved unsought values comprising aluminum, and suspended matter comprising silicon, comprising adjusting the acidity of the solution with nitric acid to about 0.3 N, adding gelatin to the solution to make a concentration of about 200 milligrams per liter, boiling the resulting solution for about ten minutes, then bringing the aqueous solution containing said suspended matter and said gelatin into contact with a substantially water-immiscible organic liquid extractant having a substantially larger distribution ratio with respect to the sought values than its distribution ratio with respect to the unsought values, agitating the solution, including the suspended matter, and the extractant together, discontinuing the agitation for a sufficient time to permit the resulting organic phase and the resulting aqueous phase to coalesce, separating the coalesced phases from each other, and recovering the sought values from the organic phase.

2. A method of recovering sought values from an aqueous solution containing dissolved sought values comprising uranium, dissolved unsought values comprising aluminum, and suspended matter comprising silicon, comprising adjusting the acidity of the solution with nitric acid to about 0.9 N, adding gelatin to the solution to make a concentration of about 100 milligrams per liter, boiling the resulting solution for about six minutes, then bringing the aqueous solution containing said suspended matter and said gelatin into contact with a substantially water-immiscible organic liquid extractant having a substantially larger distribution ratio with respect to the sought values than its distribution ratio with respect to the unsought values, agitating the solution, including the suspended matter, and the extractant together, discontinuing the agitation for a sufficient time to permit the resulting organic phase and the resulting aqueous phase to coalesce, separating the coalesced phases from each other, and recovering the sought values from the organic phase.

3. A method of recovering sought values from an aqueous solution containing dissolved sought values comprising uranium, dissolved unsought values comprising aluminum, and suspended matter comprising silicon, comprising adjusting the acidity of the solution with nitric acid from about 0.3 N to about 1.8 N, adding gelatin to the solution to make a concentration of from about 50 to about 200 milligrams per liter, digesting the resulting solution at from about 20° C. to the boiling point from about 3 minutes to about 30 minutes, then bringing the solution so digested into contact with a substantially water-immiscible organic liquid extractant having a substantially larger distribution ratio with respect to the sought values than its distribution ratio with respect to the unsought values, agitating the solution, including the suspended matter, and the extractant together, discontinuing the agitation for a sufficient time to permit the resulting organic phase and the resulting aqueous phase to coalesce, separating the coalesced phases from each other, and recovering the sought values from the organic phase.

References Cited in the file of this patent

UNITED STATES PATENTS

| 2,800,387 | Kimball et al. | July 23, 1952 |
| 2,860,031 | Grinstead | Nov. 11, 1958 |

OTHER REFERENCES

Iler: "The Colloid Chemistry of Silica and Silicates," pages 59–67 (1955).

IDO–14468, pp. 11–15, 18, 22, 23, 25, 26, 28, 30, 32, 34, 36, 40, 43–45, 47, 48, 51–54, February 6, 1959.

DP–293, pp. 4–10, June 1958.

IDO–14489, pp. 13, 15, 17–19, October 20, 1959.

IDO–14486, pp. 9, 10, 13, 16, 18–20, 22–25, November 25, 1959.